(12) United States Patent
Schellekens et al.

(10) Patent No.: US 9,973,632 B2
(45) Date of Patent: May 15, 2018

(54) CONFERENCE SYSTEM AND PROCESS FOR OPERATING THE CONFERENCE SYSTEM

(71) Applicant: Robert Bosch GmbH, Stuttgart (DE)

(72) Inventors: Sjack Schellekens, Tilburg (NL); Marc Smaak, Bergen op Zoom (NL); John Meeusen, Best (NL); Hans Van Der Schaar, Breda (NL)

(73) Assignee: Robert Bosch GmbH, Stuttgart (DE)

( * ) Notice: Subject to any disclaimer, the term of this patent is extended or adjusted under 35 U.S.C. 154(b) by 216 days.

(21) Appl. No.: 14/775,866

(22) PCT Filed: Mar. 15, 2013

(86) PCT No.: PCT/EP2013/055419
§ 371 (c)(1),
(2) Date: Sep. 14, 2015

(87) PCT Pub. No.: WO2014/139589
PCT Pub. Date: Sep. 18, 2014

(65) Prior Publication Data
US 2016/0028896 A1    Jan. 28, 2016

(51) Int. Cl.
*H04M 3/56*    (2006.01)
*H04N 7/15*    (2006.01)
(Continued)

(52) U.S. Cl.
CPC ........ *H04M 3/568* (2013.01); *H04L 12/1822* (2013.01); *H04L 65/1083* (2013.01);
(Continued)

(58) Field of Classification Search
CPC ..... H04M 3/56; H04M 3/568; H04L 12/1822; H04L 65/1083; H04L 65/403; H04N 7/15; H04R 3/005
See application file for complete search history.

(56) References Cited

U.S. PATENT DOCUMENTS 6,591,368 B1 *   7/2003   Ryu ..................... G06F 1/26
                                                        710/310
8,332,671 B2 *  12/2012   Nagao ................. G06F 1/266
                                                        713/310
(Continued)

FOREIGN PATENT DOCUMENTS

EP           1686835         8/2006
JP         2005217862        8/2005
(Continued)

OTHER PUBLICATIONS

International Search Report for Application No. PCT/EP2013/055419 dated Oct. 24, 2013 (English Translation, 3 pages).
(Continued)

*Primary Examiner* — Jenee Holland
(74) *Attorney, Agent, or Firm* — Michael Best & Friedrich LLP

(57) ABSTRACT

Conference systems are often installed in plenary halls or meeting rooms, whereby such conference systems typically consist of a central equipment and equipment for the participants of the discussion. The central equipment is usually used to control the conference system and supply power to the participant equipment. A conference system 1 comprising a plurality of delegate units 2,10, whereby the delegate units 2, 10 comprise a microphone 22 for receiving a speech signal from a speaker, a control device 4 for providing the delegate units 2,10 with power, a network connection 6 for connecting the plurality of delegate units 2,10 with the control device 4, whereby the network connection 6 is operable to transmit the power from the control device 4 to the delegate units 2,10, whereby at least one of the delegate units 2,10 is a control delegate unit 10, whereby the control delegate unit 10 comprises a wake-up interface 11, whereby the conference system 1 is operable to activate the control
(Continued)

device 4 and/or the other delegate units 2 from an un-activated state into an activated state as a reaction to the use of the wake-up interface 11.

18 Claims, 2 Drawing Sheets

(51) Int. Cl.
  *H04L 12/18* (2006.01)
  *H04R 3/00* (2006.01)
  *H04L 29/06* (2006.01)

(52) U.S. Cl.
  CPC ............. *H04L 65/403* (2013.01); *H04N 7/15* (2013.01); *H04R 3/005* (2013.01); *H04M 3/56* (2013.01)

(56) References Cited

U.S. PATENT DOCUMENTS

| | | | | |
|---|---|---|---|---|
| 8,468,377 | B2* | 6/2013 | Scott | G06F 1/3209 713/320 |
| 2001/0005894 | A1* | 6/2001 | Fukui | G06F 1/26 713/310 |
| 2002/0078153 | A1* | 6/2002 | Chung | G06Q 10/10 709/204 |
| 2002/0193073 | A1* | 12/2002 | Fujioka | H04W 76/066 455/41.1 |
| 2003/0125922 | A1* | 7/2003 | Grochowski | G06F 1/26 703/18 |
| 2003/0138119 | A1* | 7/2003 | Pocino | H04M 3/561 381/119 |
| 2003/0149724 | A1* | 8/2003 | Chang | H04L 12/1822 709/204 |
| 2003/0233587 | A1* | 12/2003 | Sanu | G06F 1/24 713/300 |
| 2004/0041697 | A1* | 3/2004 | Nattkemper | G06F 1/28 370/464 |
| 2004/0109192 | A1* | 6/2004 | Nuttall, Jr. | G06F 1/266 358/1.14 |
| 2005/0267605 | A1* | 12/2005 | Lee | G05B 15/02 700/19 |
| 2006/0031292 | A1* | 2/2006 | Deshpande | G06Q 10/107 709/204 |
| 2008/0059819 | A1 | 3/2008 | Kim | |
| 2008/0256598 | A1* | 10/2008 | Diab | G06F 1/266 726/2 |
| 2009/0011801 | A1 | 1/2009 | Van Der Schaar et al. | |
| 2009/0086949 | A1* | 4/2009 | Caspi | H04M 3/385 379/202.01 |
| 2009/0125739 | A1 | 5/2009 | Satoh | |
| 2009/0251309 | A1* | 10/2009 | Yamasuge | H04B 5/02 340/539.3 |
| 2010/0226487 | A1* | 9/2010 | Harder | G06F 1/325 379/202.01 |
| 2010/0229009 | A1* | 9/2010 | Zhao | G06F 1/266 713/320 |
| 2011/0038362 | A1* | 2/2011 | Vos | G10L 19/012 370/352 |
| 2011/0182208 | A1* | 7/2011 | Shima | G06F 1/266 370/254 |
| 2011/0302430 | A1* | 12/2011 | Boss | G06F 1/26 713/310 |
| 2012/0060042 | A1* | 3/2012 | Buhari | G06F 1/266 713/320 |
| 2012/0117149 | A1* | 5/2012 | Nagpal | G06F 1/3209 709/204 |
| 2012/0164945 | A1* | 6/2012 | Fujiwara | H04L 12/1822 455/41.2 |
| 2012/0164946 | A1* | 6/2012 | Fujiwara | H04L 12/1822 455/41.2 |
| 2012/0185718 | A1* | 7/2012 | Miyoshi | G06F 1/266 713/323 |
| 2014/0074909 | A1* | 3/2014 | Gunderson | H04L 12/1822 709/203 |
| 2015/0033043 | A1* | 1/2015 | Vorobyev | G06F 1/266 713/310 |
| 2015/0370312 | A1* | 12/2015 | Desposito | G06F 1/3206 713/323 |

FOREIGN PATENT DOCUMENTS

| | | |
|---|---|---|
| JP | 2009531894 A | 9/2009 |
| JP | 2010268324 A | 11/2010 |

OTHER PUBLICATIONS

"Digital Congress Network," Internet Citation, May 26, 2003, Retrieved from the Internet <URL: http://web.archive.org/web/20030526163953/http://www.digitalcongress.co.uk/pdf/DCNcongress%20data%20sheets.pdf>.

* cited by examiner

CONFERENCE SYSTEM AND PROCESS FOR OPERATING THE CONFERENCE SYSTEM

BACKGROUND OF THE INVENTION

The invention relates to a conference system and a process for operating the conference system. More specifically, the invention relates to a conference system comprising a plurality of delegate units, whereby the delegate units comprise a microphone for receiving a speech signal from a speaker, a control device for providing the delegate units with power, a network connection for connecting the plurality of delegate units with the control device, whereby the network connection is operable to transmit the power from the control device to the delegate units.

Conference systems are often installed in plenary halls or meeting rooms, whereby such conference systems typically consist of a central equipment and equipment for the participants of the discussion. The central equipment is usually used to control the conference system and supply power to the participant equipment.

Such a conference system is for example disclosed in the document EP 1686835, which probably represents the closest prior art. The conference system comprises a plurality of participant units and a central control unit, which are connected by an audio connection network.

SUMMARY OF THE INVENTION

Subject matter of the invention is a conference system, which is operable and/or adapted to be used for a conference or a discussion in a conference or discussion area, for example in a meeting or conference room, a plenary hall etc. The conference system is adapted to receive speech signals from speakers, to process, especially to transmit the speech signal and to emit the speech signal for example over loudspeakers or headphones.

The conference system comprises a plurality of delegate units, for example more than 20, especially more than 50 delegate units. Also conference systems with more than 100 or 1000 delegate units are possible. Preferably each of or most of the delegate units comprise a microphone for receiving a speech signal from a speaker. The speaker normally stands or sits in front of the delegate unit. The delegate unit may comprise a body portion, which is positioned on a table, whereby the microphone is fixed to the body portion. The delegate unit may also be called participant unit.

The conference system further comprises a control device, which provides power to the delegate units, whereby the power is used as operating power by the delegate units to receive the speech signal and/or to process, especially to transmit the speech signal. In a preferred embodiment each delegate unit comprises a communication module for communicating with other components of the conference system as communication partners. Preferably the communicating includes transmitting the speech signal or a processed speech signal and/or transmitting commands or status messages.

The conference system further comprises a network connection, whereby the network connection connects the plurality of delegate units with the control device. The network connection at least realizes the function of transmitting the power from the control device to the delegate units in order to supply the delegate units with the operating power. In a preferred realization of the invention the network connection is operable to transmit communications, especially commands.

According to the invention it is proposed, that at least one of the delegate units is a control delegate unit. The control delegate unit comprises a wake-up interface, which allows the speaker to input a wake-up signal. The conference system is operable to activate the control device and/or the other delegate units from an un-activated state into an activated state as a reaction to the use of the wake-up interface, especially as a reaction to the input of the wake-up signal. The activated state of the conference system is a state in which the conference system is ready to support a discussion or is supporting a discussion, the un-activated state is a state in which the conference system is not ready to support the discussion. Supporting the discussion includes for example receiving and transmitting a speech signal by one of the delegate units and emitting the speech signal by loudspeakers or by headphones.

It is one finding of the invention, that the participants of the meeting, including the chairman and/or a meeting administrator, usually do not have access to the place, where the control device for providing the delegate units with power is positioned. For example the control device may be placed in a central equipment room. In order to avoid the situation that they find a powered down conference system when entering the meeting place, the conference system is either always powered or at least always powered during office hours. The invention proposes to incorporate a wake-up interface in one of the delegate units, so that it is easy for a chairman or meeting manager or another speaker to power up the conference system from within the meeting place, especially from the control delegate unit. Therefore the conference system may stay in the un-activated state as long as the wake-up interface is used, whereby the conference system will be available to start the meeting within a limited time.

In a preferred realization of the invention the wake-up interface is a button or a switch, which is arranged on the control delegate unit, especially on the body portion of the delegate unit, or coupled with the control delegate unit. It is especially preferred, that wake-up interface, especially the button or the switch is illuminated for indicating, that a power up of the conference system is possible by using the wake-up interface.

In a further preferred embodiment, the control delegate unit is operable to start, especially to initiate a communication with the control device as a reaction to the use of a wake-up interface. In this embodiment it is preferred, that the control delegate unit comprises a or the communication module for communicating with at least the control device, whereby the network connection enables a communication between the control delegate unit and the control device. As soon as the wake-up interface is used by a user, the control delegate unit starts the communication with the control device.

It is furthermore preferred, that the control device is operable to activate or activate itself and/or the other delegate units from the un-activated state into the activated state as a reaction to the start of the communication. The start of the communication may be realized by sending a message from the control delegate unit to the control device or indicating its active status in the network connection. The message is preferable realized as a digital message.

It is especially preferred that the control device is activated from a power-safe mode as the un-activated state into the activated state as the reaction to the use of the wake-up interface and/or as the reaction to the start of the communication with a control delegate unit. It is preferred, that the power consumption in the power-safe mode of the control device is less than fifty percent, preferably less than thirty percent of the power consumption of the control device in the activated state. In special embodiments, the power consumption may be reduced to five percent or less of the power consumption in the activated state. In this embodiment nearly all power needed for the delegate units can be saved in the un-activated state.

In a further preferred embodiment of the invention the control device comprises a plurality of outputs, which are adapted to connect the plurality of delegate units over the network connection with the control device. The outputs provide the power for the delegate units. At least one of the outputs is adapted to connect a subset of the plurality of delegate units with the control device. The subset comprises more than ten, preferably more than twenty delegate units. At least one of the outputs, especially another output, is a control output, whereby the control output connects the control delegate unit with the control device. Preferably the control output is exclusively connected with the control delegate unit, so that the control delegate unit is the only user of the control output.

The control device can be set in the un-activated state and in the activated state. In the un-activated state, especially in the power-safe mode, only the control output is provided with power, whereby the other outputs are de-activated, so that no power is transmitted to the other delegate units. As a result the power consumption of all other delegate devices over the outputs is 0 Watt. As the conference system may have a large volume of other delegate units connected, it is energy saving that no power must be used to support for example functions like Wake-up on LAN. In the activated state all of the outputs are provided with power. The advantage of the embodiment is, that during the un-activated state the control device need not to supply power to the outputs for the other delegate units, it is only necessary to provide the control output for the control delegate unit with power. The supply with power is necessary also in the un-activated state, especially in the power-safe mode, to enable the control delegate device to process the use of die wake-up interface, especially to start the communication with a control delegate unit as the reaction to the use of the wake-up interface. Consequently, most of the power needed for the control device can be saved in the un-activated state of the control device.

It is preferred, that the subset of the delegate units, which are connected to a common output, are arranged in a daisy chain. It is furthermore preferred, that the control output is adapted to provide power, which is restricted to the amount, which is sufficient for one single control delegate unit.

In a further preferred embodiment of the invention the delegate units are operable to be activated from an un-activated, especially powered-off mode, into the activated state as a reaction to the providing of power over the network connection. Especially the delegate units are self-starting or self-activating as soon as they receive power from the control device over the network connection.

In a preferred development of the invention the control delegate unit is activated from a power-safe mode into an activated state as a reaction to the use of the wake-up interface. In this preferred development, the control delegate unit comprises an electronic circuit to shut down its internal power supply in order to change into a power-safe mode. In order to activate the power supply again, the wake-up interface must be used. This preferred development saves power by using a power-safe for the control delegate unit.

In a preferred embodiment of the invention the conference system is operable to perform a powering down sequence of the conference system from the activated state, whereby the control device is set into the un-activated state, especially in the power-safe mode, thereby de-activating the outputs for the other delegate units and thus de-activating the power supply for the other delegate units. As a consequence the other delegate units are also set in the un-activated state. The trigger for the powering down sequence could be given by pressing a button or by another manual action. It is furthermore claimed, that the powering down of the conference system comprises setting the control delegate unit into the power-safe mode. As a result the other delegate units are powered off and the control delegate unit as well as the control device are in the power-safe mode.

In a possible embodiment of the invention the conference system comprises an activity detection module for detecting activity of participants of the conference or discussion in the conference area. The activity detection module may detect the activity by sensing the use of the delegate units, by receiving noise over the microphones of the delegate units and/or by using presence detection devices like cameras or motion sensors. It is preferred that the conference system is operable to power down automatically in case no activity was detected by the activity detection module for a predefined time.

The conference system is preferably operable to be set into a meeting mode and into a non-meeting mode. In both modes the control devices, the delegate units and the control delegate unit are in the activated state. The non-meeting mode allows powering down the conference system automatically in case no activity is detected by the activity detection module for a predefined time. To the contrary the meeting mode prevents the automatically powering down. The underlying idea of this embodiment is, that it should be prevented to automatically power down the conference system during a meeting also in case the activity detection module does not detect any activity. The change from the meeting mode to the non-meeting mode is triggered by user interaction, especially by a user interaction from the chairman. At the end of a meeting normally the chairman closes the meeting, whereby the chairman uses a user interface on his control delegate unit to close all recording of the meeting (who has been speaking, how long, audio recordings, voting results etc.). The conference system recognize this state change to know the critical part of the meeting is closed and changes from the meeting mode into the non-meeting mode. The conference system is still available and thus powered for any after-discussions or review of the meeting results. However the conference system now starts to detect activity in the conference area. Activity can be audio, motion detected by motion detectors or cameras or input data (users pressing buttons or controlling GUI elements). If these activities are absent for a specific timeout (e.g. 30 minutes) the conference system will automatically power down. It is also possible to do the powering down manually from a delegate position, but in both cases this is preferably only possible, if the conference system is in the non-meeting mode. With this embodiment the conference system never powers down accidentally during the critical term of the meeting, for instance because everybody is quiet, sitting still and not pushing any controls, because they are for example watching a video. If it is forgotten to manual power down the conference system, it will power down after the specified timeout automatically. There is no need for a power down message e.g. "this system will power down in ten seconds", because it is ensured that the meeting has ended.

A further subject matter of the invention is a process for operating the conference system as described before. In a preferred embodiment of the process, the delegate units are arranged in 15 a meeting room and the control device is arranged in a room separated from the meeting room.

BRIEF DESCRIPTION OF THE DRAWINGS

Further details, advantages or effects of the invention will become apparent by the description of special embodiments of the invention. The figures show.

DETAILED DESCRIPTION

Figure 1:
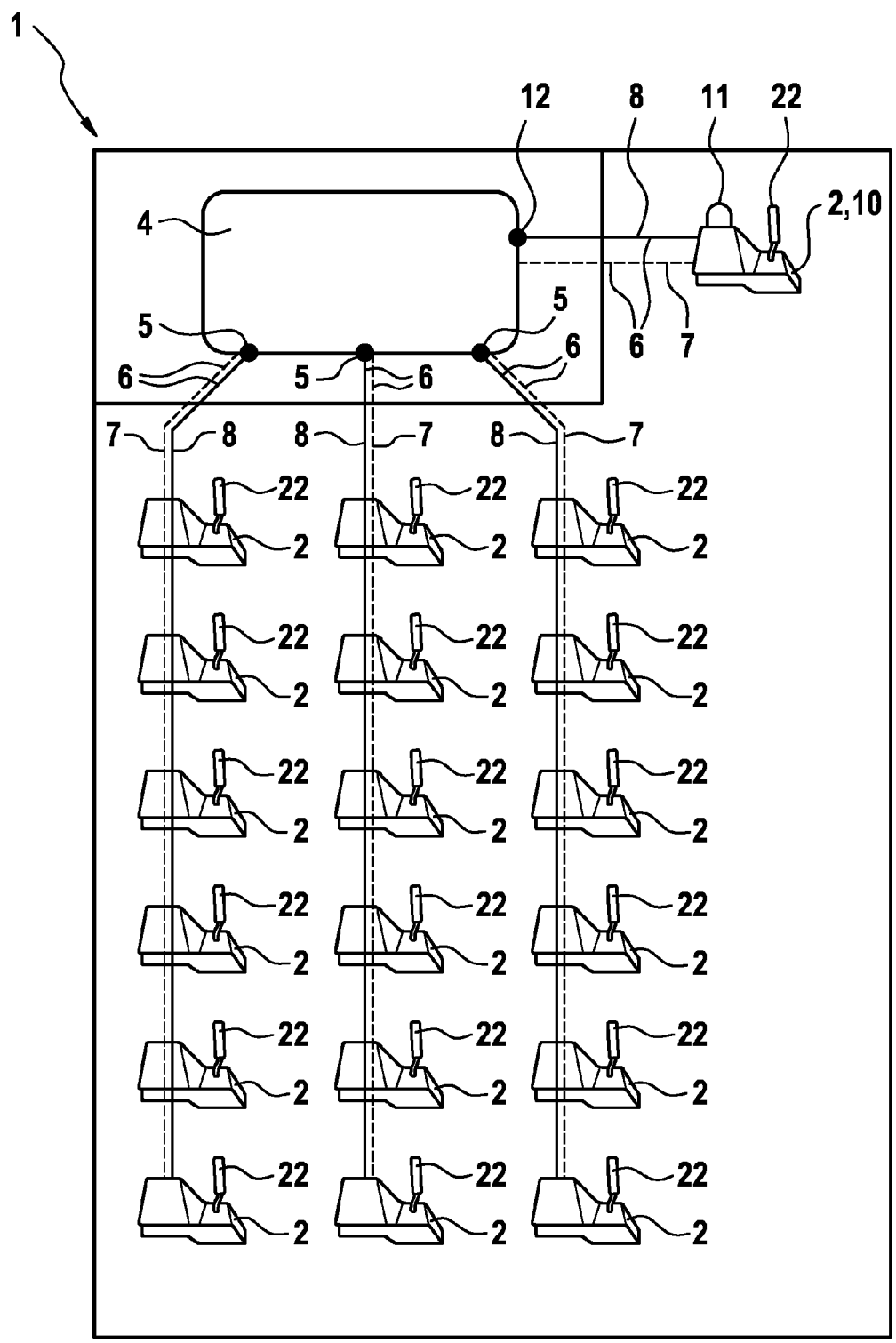
FIG. 1 a block diagram of the conference system as embodiment of the invention.

FIG. 1 shows in a schematic block diagram a conference system 1 as an embodiment of the invention, which can be used to support discussions in a conference area.

The conference system 1 comprises a plurality, for example more than fifty or hundred delegate units 2, which are distributed in the meeting room 3 as conference area. The meeting room 3 maybe also be realized as a plenary hall for example for political discussions. Each delegate unit 2 comprises a microphone 22, which is used to receive a speech signal from a speaker in front of the delegate unit 2. The delegate units 2 with the microphones 22 are for example desktop devices realized as embedded systems.

The delegate units 2 are connected with a control device 4, which has two main functions: The first function is to control the conference system 1 in its entirety, especially to receive and transmit audio signals, commands and communications from and to the delegate units 2 and to loudspeaker or headphones, which are not shown in the block diagram in FIG. 1. The control device 4 may for example comprise amplifiers for amplifying the speech signals. This is possible for example in case of an analogue system. As an alternative for example only the centralized audio processing is performed in the control device 4. The second function of the control device 4 is to provide the delegate units 2 with power. The power is needed by the delegate units 2 as operating power to receive the speech signal by the microphone 22, to process the speech signal and to transmit the processed speech signal to the control device 4.

For the second function the control device 4 provides a plurality of outputs 5 and a control output 12, which are connected to a network connection 6. The delegate units 2 are connected to the control device 4 by the network connection 6. In accordance with the functions, the network connection 6 comprises wires for powering 7 and wires for communications 8. Alternatively, both functions can be realized in only one wire. The communication is preferably based on the internet protocol and/or is a digital communication. The delegate 2 units are connected to the control device 4 in a daisy chain configuration.

The control device 4 is arranged in a separate room 9 to the meeting room 3, which is for example a central equipment room and has a restricted access. The participants of the meeting, including the chairman and/or a meeting administrator, usually do not have access to the central equipment room 9.

Therefore there is a need, that the conference system 1 is enabled to be activated by persons which only have access to the meeting room 3 and not to the central equipment room 9. Such a possibility would allow to power down the conference system 1 for most of the time and be available for persons which only have access to the meeting room 3 as soon as the conference system 1 is needed. This possibility would underline an environmental friendly conferencing system.

One of the delegate units 2, which is named control delegate unit 10, comprises a wake-up interface, which is embodied as a simple button 11 on the control delegate unit 10. As indicated in FIG. 1 the control delegate unit 10 is connected to the control output 12, whereby the control delegate unit 10 is the only participant of the control output 12.

Figure 2:
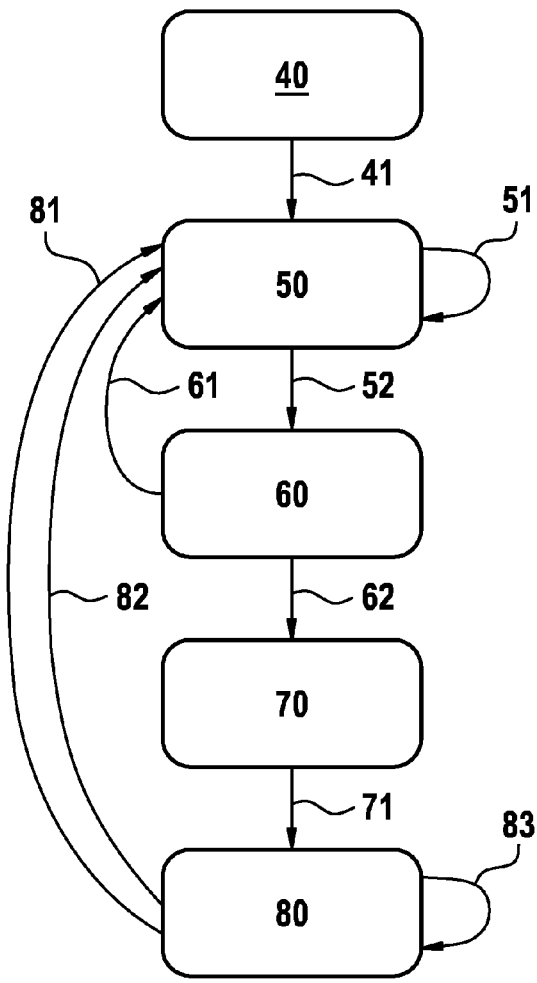
FIG. 2 a flow diagram of the operating of the conference system as shown in FIG. 1.

The way of operation will be explained in connection with FIG. 2, showing a flow diagram illustrating the powering-on and powering-off of the conference system 1 of FIG. 1. For visualization of the operational modes of the components during the powering-on and powering-off sequences, a table is added, whereby a cross "X" indicates a powered off status, a "P" indicates a power-safe status and a "hook" indicates the activated status. The powered off status and the power-safe status represent both un-activated status. Components in the power-safe status are partly deactivated, so that the power input is lower compared to the activated status.

In a step 40 the whole conference system 1 is powered off, so that the control device 4, the outputs 5, the control output 12, the control delegate unit 10 and the other delegate units 2 are also powered off, which is indicated in the table by a cross.

With a step 41 the conference system is set into an un-activated state. In this un-activated state the control device 4 is set into a power-safe mode P, whereby the outputs 5 are still de-activated but the control output 12 is powered, so that the 2 5 control delegate unit 10 is supplied with power. The control delegate unit 10 is nevertheless in a power-safe mode. The other delegate units 2, which are connected by the network connection 6 are still de-activated/powered off.

During step 51 the button 11 is pressed resulting in a wake-up of the control delegate unit 10, whereby the delegate unit 10 changes from the power-safe mode into the operation mode, which is indicated by a hook in FIG. 2.

In a step 52 the control delegate unit 10 starts a communication with the control device 4, so that the control device 4 detects the control delegate 10 on the network connection 6. As a reaction to the detection of the control delegate unit 10 by the control device 4 the control device 4 changes from the un-activated or power-safe mode P to an activated state, whereby all outputs 5 are supplied with power.

As soon as the other delegate units 2 are supplied with power, they start to power-up automatically, so that in a step 60 the whole conference system 1 is in an activated state.

In a step 62 the meeting is opened by a chairman, whereby the meeting status MO of the conference system 1 is changed from a non-meeting mode in a meeting mode.

During a step 70 the meeting is running, whereby all participants can speak over the conference system 1. After the meeting the chairman set the meeting status MO of the conference system 1 in a non-meeting mode, whereby still all components are in the activated state, so that still questions and answers can be transmitted by the conference system 1.

For setting the conference system 1 in the un-activated state as defined in connection with step 50, there are various possibility provided.

A first possibility according to step 81 is, that a manual power-off command is input, whereby the conference system 1 returns into the un-activated state as shown at the beginning of step 50.

A second possibility is, to use a activity detector device (not shown) whereby according to a step 82 the conference system 1 is changed to the un-activated state according to the beginning of step 50 in case no activity is detected by the activity detector device for a predefined time. In case the activity detection device detects an activity the conference system 1 remains in the active state but in the non-meeting mode indicated by the step 83.

A third possibility for returning the conference system 1 to the un-activated state according to the beginning of step 50 is indicated by step 61. In case no activity is detected by the activity detection device for a predefined time before the meeting starts, the conference system 1 will automatically change in to the un-activated state.

conference system
delegate units
meeting room
control device/
outputs
network connection
powering
communication
central equipment room
control delegate unit
button
control output
22 microphone

The invention claimed is:

1. A conference system comprising:
  a plurality of delegate units, wherein the plurality of delegate units have a microphone for receiving a speech signal from a speaker;
  a control device for providing the delegate units with power; and
  a network connection for connecting the plurality of delegate units with the control device,
  wherein the network connection is operable to transmit the power from the control device to the delegate units,
  wherein at least one of the plurality of delegate units is a control delegate unit, wherein the control delegate unit includes a wake-up interface,
  wherein the conference system is operable to activate the control device or the other delegate units from an un-activated state into an activated state as a reaction to the use of the wake-up interface, and
  wherein the conference system is operable to be set into a meeting mode and into a non-meeting mode, wherein in both the meeting mode and the non-meeting mode the control device and the delegate units are in the activated state, wherein the conference system is operable to power down automatically only in case the conference system is in the non-meeting mode.

2. The conference system according to claim 1, wherein the wakeup interface is a button or a switch.

3. The conference system according to claim 1, wherein the control delegate unit is operable to start a communication with the control device as a reaction to the use of the wake-up interface and that the control device is operable to activate or to activate the other delegate units from the un-activated state into the activated state as a reaction to the start of the communication.

4. The conference system according to claim 1, wherein the control device is activated from a power-safe mode as the un-activated state into the activated state as a reaction to the use of the wake-up interface or as a reaction to the start of the communication with the control delegate unit.

5. The conference system according to claim 1, wherein the control device comprises a plurality of outputs for connecting the plurality of delegate units over the network connection with the control device, wherein at least one of the plurality of outputs is adapted to connect a subset of the plurality of delegate units with the control device, wherein at least one of the plurality of outputs is a control output, wherein the control output is adapted to connect the control delegate unit with the control device, wherein the control device is operable to be set in the un-activated state, wherein only the control output is provided with power and wherein for other outputs included in the plurality of outputs the power is deactivated, and the control device is operable to be set in the activated state, wherein all of the plurality of outputs are provided with power.

6. The conference system according to claim 5, wherein the subset of the plurality of delegate units is arranged in a daisy chain.

7. The conference system according to claim 5, wherein the control output is adapted to provide only power for one single control delegate unit.

8. The conference system according to claim 5, wherein the other delegate units are activated from an un-activated, especially powered-off, state into the activated state as a reaction to the providing of power over the network connection.

9. The conference system according to claim 1, wherein the control device is activated from a power-safe mode into an activated state as a reaction to the use of the wake-up interface.

10. The conference system according to claim 1, wherein the powering down of the conference system is realized by setting the control device into the un-activated state, thereby deactivating the power supply for the other delegate units and thus setting the other delegate units also in the un-activated state.

11. The conference system according to claim 10, wherein the powering down of the conference system is furthermore realized by setting the control delegate unit into the power-safe mode.

12. A method for operating the conference system according to claim 1, comprising the step of activating the control device or the other delegate units from an un-activated state into an activated state as a reaction to the use of the wake-up interface.

13. The method according to claim 12, wherein the control device is positioned in a room separated from a meeting room.

14. The conference system according to claim 1, wherein the conference system is configured both to activate the control device and the other delegate units from an un-activated state into an activated state as a reaction to the use of the wake-up interface.

15. The conference system according to claim 1, wherein the control delegate unit is operable both to start a communication with the control device as a reaction to the use of the wake-up interface and that the control device is operable to activate and to activate the other delegate units from the un-activated state into the activated state as a reaction to the start of the communication.

16. The conference system according to claim 1, wherein the control device is activated from a power-safe mode as the un-activated state into the activated state as a reaction to the use of the wake-up interface and as a reaction to the start of the communication with the control delegate unit.

17. A method for operating the conference system according to claim 1, comprising the step of activating both the control device and the other delegate units from an un-activated state into an activated state as a reaction to the use of the wake-up interface.

18. The conference system according to claim 1, further comprising an activity detection module for detecting activity within a conference area, wherein the conference system is operable to power down automatically in case no activity was detected by the activity detection module for a predefined time.

* * * * *